(12) United States Patent
Smerdon, Jr.

(10) Patent No.: US 6,401,997 B1
(45) Date of Patent: Jun. 11, 2002

(54) BICYCLE-MOUNTED LIQUID STORAGE AND DELIVERY SYSTEM AND SUPPORT BRACKET

(76) Inventor: E. Thomas Smerdon, Jr., 4001 Newhall Rd., Columbus, OH (US) 43220

( * ) Notice: Subject to any disclaimer, the term of this patent is extended or adjusted under 35 U.S.C. 154(b) by 0 days.

(21) Appl. No.: 09/390,451

(22) Filed: Sep. 7, 1999

Related U.S. Application Data

(60) Provisional application No. 60/099,802, filed on Sep. 10, 1998.

(51) Int. Cl.[7] .................................................. B62J 11/00
(52) U.S. Cl. ........................ 224/414; 224/426; 224/442
(58) Field of Search .............................. 224/414, 425, 224/426, 442; 220/739, 740

(56) References Cited

U.S. PATENT DOCUMENTS

| | | | |
|---|---|---|---|
| 596,998 A | * 1/1898 | Hawkins et al. | ......... 224/414 X |
| 4,095,812 A | 6/1978 | Rowe | |
| 4,274,566 A | 6/1981 | Rowe | |
| 4,386,721 A | * 6/1983 | Shimano | ................. 224/414 X |
| 4,441,638 A | * 4/1984 | Shimano | .................... 224/414 |
| 4,911,339 A | 3/1990 | Cushing | |
| 5,024,358 A | * 6/1991 | Reichert et al. | ......... 224/414 X |
| 5,060,833 A | 10/1991 | Edison et al. | |
| 5,085,349 A | 2/1992 | Fawcett | |
| 5,115,952 A | 5/1992 | Jenkins | |
| 5,158,218 A | * 10/1992 | Wery | .......................... 222/610 |
| 5,215,231 A | * 6/1993 | Paczonay | .................... 222/610 |
| 5,301,858 A | 4/1994 | Hollander | |
| 5,301,860 A | 4/1994 | Paczonay | |
| 5,326,124 A | 7/1994 | Allemang | |
| 5,358,142 A | * 10/1994 | Holmes | .................. 222/610 X |
| 5,607,087 A | 3/1997 | Wery et al. | |
| 5,645,404 A | 7/1997 | Zelenak | |
| 5,680,958 A | * 10/1997 | Mann et al. | ................. 220/739 |
| 5,755,368 A | 5/1998 | Bekkedahl | |
| 5,788,134 A | * 8/1998 | Matic, Jr. | .................... 224/414 |
| 6,073,796 A | * 6/2000 | Mogil | .................... 220/592.17 |

* cited by examiner

Primary Examiner—Stephen K. Cronin

(57) ABSTRACT

The present invention discloses a fluid storage and delivery system for bicyclists. In the preferred embodiment, the fluid is contained in a collapsible fluid container adapted to be removably inserted within the sides of a first support bracket mounted to the bicycle down tube frame member and a second support bracket mounted to the seat tube frame member. A conduit for delivering liquid to a cyclist extends from an inlet end within the fluid container to an outlet end accessible to the cyclist and may include a check valve at its inlet end. The conduit may also include a disconnection means to allow the conduit to be disconnected at the outlet side of the fluid container. Preferably the disconnection means is a quick disconnect tube connector with a flow shut-off capability oriented at the inlet side of the connection, so as to provide a seal against leakage from the fluid container when the connectors are disconnected. The support brackets have sides defining an open space between the sides and a central mounting plate to which the sides are attached, with the mounting plate having a series of apertures along its length and adapted for fastening the mounting plate to the threaded openings customarily used for mounting water bottle cages to bicycle seat and down tube frame members. A molded container adapted to be held within the sides of the support bracket is also disclosed.

21 Claims, 5 Drawing Sheets

BICYCLE-MOUNTED LIQUID STORAGE AND DELIVERY SYSTEM AND SUPPORT BRACKET

PRIOR APPLICATION

This application is a continuation in part of U.S. application Ser. No. 60/099,802, filed Sep. 10, 1998.

FIELD OF THE INVENTION

The present invention is in the field of bicycles and bicycling. The present invention relates to a fluid container system for bicyclists, and more specifically to an apparatus for carrying liquid in a container mounted to a bicycle and from which liquid may be dispensed to the cyclist through a beverage tube.

BACKGROUND OF THE INVENTION

In bicycling, it has been the practice of cyclists to carry water or other beverages to quench thirst and rehydrate the body, especially during long rides or racing events. For cyclists, the traditional method of hydration has been to drink from water bottles that are held in cages attached to the bicycle frame. For hot weather or long distance cycling, two water bottles are typically carried, one in a cage attached to the bicycle down tube and the other in a cage attached to the seat tube. A principal shortcoming of traditional water bottles is that they lack sufficient liquid capacity to provide adequate hydration over an extended period, which means the cyclist must find a place to stop to refill or curtail the ride. Another drawback is the need for the cyclist to reach down to remove and replace the bottle, which can compromise control of the bicycle and presents the risk of dropping the bottle. This is a particular concern in group riding situations and when riding over rough terrain, such as trail riding on a mountain bike. In addition, many mountain bikes in the smaller frame sizes have very short seat tubes, and as a result lack sufficient clearance to permit the convenient removal and replacement of a second water bottle attached to the seat tube.

Prior art reveals a variety of attempts to eliminate the need for a cyclist to reach down and remove and replace a water bottle in order to drink while riding. A number of these have utilized straw-like drinking tubes that extend from a bottle mounted to the bicycle. For example, U.S. Pat. No. 4,095,812 to Rowe (1978) shows a drinking straw that extends into a bottle mounted on the bicycle frame. The straw is retractably stored on a spring-loaded reel or, alternatively, is coiled inside a container mounted to the bicycle. Another embodiment shows a telescoping straw that collapses into an elongated housing. U.S. Pat. No. 4,274,566 to Rowe (1981) discloses an improved reel mechanism for retracting the drinking tube. The drinking tube connects with a liquid supply tube that extends into a bottle mounted separately from the reel mechanism. The supply tube incorporates a check valve at the submerged end which prevents water from flowing back into the bottle.

The reel mechanisms described in the Rowe '812 and '566 patents are cumbersome and require that the rider maintain a firm hold on the tube during drinking to prevent it from retracting. The alternative telescoping tube and coiled tube embodiments in Rowe '812 are also inconvenient, because the former requires the rider to lean over to drink from a fixed position rigid tube and the latter requires the rider to carefully feed the coiled tubing back into the storage canister after drinking.

U.S. Pat. No. 5,024,358 to Reichert et. al (1991) shows a narrow bottle that snaps onto the top and down tubes of the bicycle frame. A drinking tube extends upward from the bottle and can be snapped into a holder attached to the handlebar for the purpose of positioning the tube in front of the rider. The mounting location of the bottle described in Reichert '358 occupies the space just above where down tube mounted derailleur shifters are typically located. This bottle placement would interfere with the operation of such shifters and would prevent the rider from operating the front and rear derailleur shifters with the same hand. In addition, the bottle's shape renders it unsuitable for bicycles that have downwardly and rearwardly sloping top tubes, such as mountain bikes.

U.S. Pat. No. 5,115,952 to Jenkins (1992) shows a liquid container with a tube that clamps to the handlebar and extends upward to a location in front of the rider's face. Like Reichert '358, the Jenkins '952 system requires the rider to lean forward to drink from a tube in a fixed position in front of the rider's face. The rider must also draw the column of liquid through the length of the tube each time a sip is desired.

U.S. Pat. No. 5,788,134 to Matic, Jr. (1998) discloses a rigid, triangularshaped liquid container that attaches to the down tube and seat tube frame members by means of a C-shaped clasp that connects to the seat tube and hook and loop fastening straps that attach to the down tube. A hose extends from the rigid container to the area of the handlebar and a hose holder clip grips the hose at its outlet end and removably attaches to the handlebar. The hose holder preferably has a handle to enable the rider to detach the hose from the handlebar for drinking. This also has the shortcoming of requiring the rider to draw liquid through the length of tubing each time a drink is required. It also employs a rigid container, which is not well-suited to accommodate differences in bicycle frame geometry.

U.S. Pat. No. 5,301,858 to Hollander (1994) shows a bottle with a two-section drinking tube. The tube sections are connected by means of an oversleeve that permits the bottle to be removed from the bike and used as a hand-held or body-mounted sport bottle. Mounting clips are used to attach the upper drinking tube section to the bicycle frame or handlebar stem. In the preferred embodiment, the upper drinking tube section is provided with a spring sleeve that extends the tube toward the rider's face when the tube is removed from the mounting clip. In another embodiment, the upper drinking tube is made of memory flex tubing that returns to a tightly coiled shape after extension during drinking. The Hollander '858 embodiments share several of the shortcomings of the other prior art systems, including a reliance on a single frame-mounted water bottle. The bottle used in the Hollander combination water bottle system is similar to the ubiquitous sport bottles commonly used in cycling, and has the same problem of limited capacity that is typical of such bottles.

Other inventions for supplying liquid to bicyclists via a drinking tube have involved a means to force liquid from a bottle mounted to the bicycle through a drinking tube without the need for suction by the rider. U.S. Pat. No. 4,911,339 to Cushing (1990) shows a cylindrical container that is pressurized by forcing air into the container through a bellows device attached to bottom of the container. Flexible tubing extends from the container to a valve and nozzle mounted to the handlebars. U.S. Pat. Nos. 5,215,231 (1993) and 5,301,860 (1994) to Paczonay disclose a water bottle holder with a compressor arm that can be actuated by the cyclist. The bottle walls are compressed to force liquid through a supply tube, and a check valve prevents the back flow of liquid. U.S. Pat. No. 5,326,124 to Allemang (1994) shows an apparatus for pumping liquid from a standard water bottle through a supply tube to the rider. U.S. Pat. No. 5,607,087 to Wery, et. al (1997) shows a water bottle that is pressurized by use of a pressurizing system such as a bicycle pump. Liquid flows through a tube connected at the lower end of the bottle to a valve at the other end of the tube. U.S. Pat. No. 5,645,404 to Zelenak (1997) shows a bicycle-mounted fluid reservoir with an electronic pump system. U.S. Pat. No. 5,755,368 to Bekkedahl (1998) discloses a bicycle water bottle that is filled with a carbonated beverage. The carbonation of the liquid pressurizes the bottle.

U.S. Pat. No. 5,358,142 to Holmes (1994) shows a mouth-pressurized drinking bag for cyclists. This system is comprised of a collapsible bladder for receiving liquid and an elastic enclosure that surrounds the bladder. The user pressurizes the bladder by blowing air into it through a drinking tube, which causes the bladder to expand against the elastic enclosure, and then clamping the tube. In the preferred embodiment, the bag is attached to the bicycle top tube and seat tube by hook-and-loop straps. An alternative embodiment shows the bag mounted to a carrying rack located over the rear wheel. The drinking tube is shown as extending upward from the handlebar to an area below the rider's face, but the patent does not show or claim a means for securing the drinking tube in the area of the handlebar and handlebar stem. One problem with Holmes '142 is that the liquid capacity of the bag depends on the strength and interior dimension of the elastic enclosure. This is because the bladder cannot practicably be filled beyond the point where the outward pressure from the weight of the liquid against the elastic is exceeded by the pressure of the elastic against the bladder. In addition, the dimensions of the bladder must be greater than those of the elastic enclosure, in order for the bladder to be able to expand the elastic enclosure when the bladder is pressurized. Another drawback to this system in its frame-mounted embodiment is that there is no means of restraining the sides of the bag. As the bag is pressurized, it will expand outward like a balloon. The expansion of the bag will cause the rider's legs to rub against the sides of the bag, thus interfering with the rider's pedaling motion.

U.S. Pat. No. 5,060,833 to Edison, et. al (1991) shows a collapsible water bag that is carried in a backpack. A flexible drinking tube runs from the lower end of the bag to a mouthpiece with valve device. The valve is opened by compressing the mouthpiece between the teeth. U.S. Pat. No. 5,085,349 to Fawcett (1992) also discloses a bite valve for use in connection with a backpack hydration system. For cycling, a basic shortcoming of a backpack hydration system is that the rider's back and shoulders must support the weight of the liquid, as opposed to the bicycle frame. This can lead to increased back, neck and shoulder fatigue and general discomfort, especially over longer distances and in hot weather. The drinking tube can also be a nuisance, because it passes over the rider's back and hangs down in front of the rider. Some cyclists also find the mouthpiece valves objectionable, due to the restricted flow through such valves and the fact that the user must maintain pressure on the mouthpiece during drinking. However, despite the obvious ergonomic shortcomings of backpack hydration systems, such systems have become quite popular, especially among mountain bikers. Today, backpack systems are the only widely available water bottle alternative that offers hands-free drinking and significantly increased liquid storage capacity.

The present invention has a number of objects and advantages. One goal is to provide a significantly larger liquid capacity than is available with water bottle systems. Another is to provide a secure means for mounting a large capacity fluid container in the inter-frame area of the bicycle, providing a comfortable alternative to backpack hydration systems. It is also a goal of the present invention to provide a system that prevents lateral movement of the fluid container during riding and has an aerodynamic profile that does not interfere with the normal pedaling motion. Another object of the frame-mounted embodiment is to place the weight of the liquid low on. the bicycle, thereby lowering the bicycle/rider center of gravity and improving stability. Still another goal of the frame-mounted embodiment is to provide an. elegant means for mounting the beverage container to the bicycle frame that permits the use of the system on a wide variety of bicycles and frame geometries;

The present invention also offers the benefit of hands-free drinking through a beverage tube and provides a secure and convenient method of attaching the outlet end of the beverage tube to the bicycle handlebar stem, while permitting the tube to be easily detached for drinking. The present invention also provides an alternative semi-rigid tube that may be positioned so that the outlet end is in front of the rider's mouth, suitable for time trialists who want to be able to drink without moving from an aerodynamic tucked position on the bike. Additionally, a check valve means is provided to prevent liquid from flowing back into the container from the beverage tube, thereby eliminating the common problem of prior art systems of requiring the rider to draw the a column of liquid from the container to the outlet end of the tube each time a drink is desired.

Another benefit of the preferred embodiment of the present invention is that the fluid container can be quickly disconnected from the drinking tube in a manner that seals the container against leakage, so that the container can be removed from the bike for convenient refilling. Moreover, the container of the preferred embodiment is made from a flexible polymeric film so that it collapses around the liquid as the container is drained, eliminating the need for a vacuum relief means and minimizing sloshing of the liquid. The insulated covering of the fluid container keeps the container contents cooler for a longer time than non-insulated bottles.

Yet another object of the present invention is to provide a support bracket that attaches to the threaded water bottle mounts commonly found on the down tube and seat tube of road and mountain bicycles marketed to the adult cycling enthusiast and that may be used to support article carriers in the open space above the bicycle bottom bracket junction of those tubes. A further object is to provide a molded fluid container for use in combination with the support bracket.

Still another object is to provide a saddle-mounted hydration system suitable for bicycles that lack a conventional frame geometry and also well suited for time trialists and triathletes who place a premium on light weight, aerodynamics, and the ability to drink without having to move from an aerodynamic position to remove a water bottle from its cage holder.

SUMMARY OF THE INVENTION

The present invention discloses a fluid storage and delivery for cyclists. In one embodiment, the fluid is contained in a fluid container enclosed within an insulative cover and supported within brackets mounted to the bicycle down tube and seat tube frame members. The fluid container is preferably made from flexible film material, so that it will collapse around the liquid as the liquid is consumed. The insulative cover preferably comprises an outer bag with a zipper closure along the top and a removable foam insulation insert that is adapted to conform to the angle of the bottom bracket junction of the down tube and seat tube. A conduit, which is preferably comprised of flexible beverage tubing, extends from an inlet end within the fluid container to an outlet end within easy reach of the rider. A check valve means is located at the inlet end of the conduit and oriented to prevent the backflow of liquid into the container. In the preferred embodiment, the conduit is capable of being disconnected at the fluid container, to permit the container to be removed conveniently from the bike for refilling.

The beverage tubing is secured to the handlebar stem by a hook and loop fastening means, which permits the beverage tube to be easily removed from the handlebar stem during riding and raised to the rider's mouth for drinking, including hands-free drinking if desired. An elastic cord can be attached to the beverage tube to help maintain the tube's looped configuration and prevent the tube from swinging against the front wheel if the tube is accidentally dropped. Alternatively, a semi-rigid beverage tube may be used to position the outlet end of the tube in front of the rider's mouth while riding.

The support brackets have sides and an open space between the sides, so that the insulative cover with the fluid container inside may be placed into the support brackets and held within the sides of the sides of the bracket. The fluid container is thus is supported in a location between the seat tube and down tube frame members and above the bottom bracket junction of such frame members.

The present invention also discloses a support bracket for holding articles within the inter-frame area between down tube and seat tube. The support bracket has a central mounting plate with a series of apertures along its length adapted for fastening the bracket to the threaded openings for mounting water bottle cages. The design of the mounting plate allows the support bracket to be positioned at a desired height above the bottom bracket. The sides of the support bracket are formed from a single length of wire or metal tubing and are welded to the mounting plate so that the area above the mounting plate is open. When mounted on the bicycle, the uppermost sides of the bracket describe a U-shape, with the bottom of the U being welded in a perpendicular orientation to the mounting plate. The present invention also shows a molded container adapted to be held within the sides of the support bracket.

Finally, the present invention includes a saddle-mounted fluid container and insulative cover, well suited for bikes that lack a traditional frame geometry, but that have a seat post and a saddle with rails beneath the saddle. The insulative cover is preferably secured to the seat post and saddle rails by hook and loop fastening straps. As with the frame-mounted system, a conduit extends from within the container to the handlebar area of the bicycle. The conduit is preferably capable of being disconnected at the fluid container, and an alternative semi-rigid beverage tube is also disclosed.

DETAILED DESCRIPTION OF THE PREFERRED EMBODIMENTS

In accordance with the foregoing summary of the invention, the following presents a detailed description of the preferred embodiments of the invention.

Figure 1:
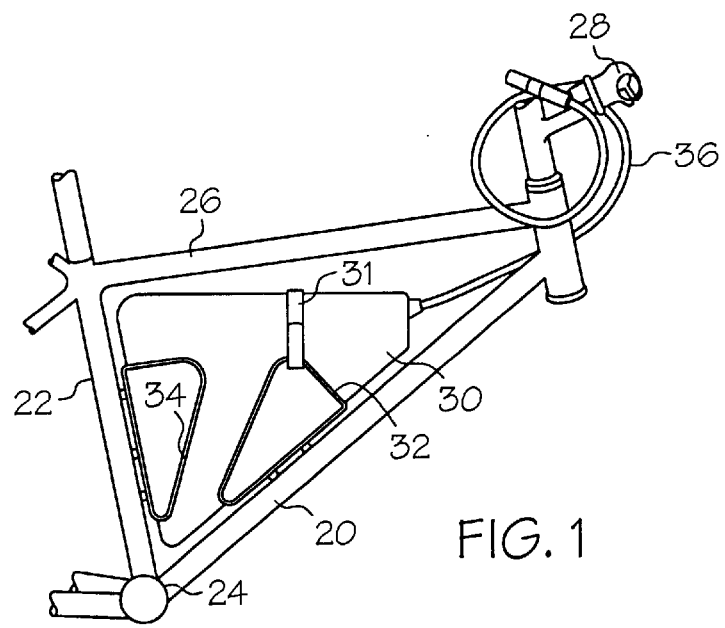
FIG. 1 is a side view of the invention mounted on a mountain bicycle frame.

FIG. 1 shows a side view of the frame-mounted fluid storage and delivery system on a mountain bike frame. An insulative cover 30 enclosing a fluid container is placed within a support bracket 32 attached to the bicycle down tube frame member 20 and a support bracket 34 attached to the seat tube frame member 22. A conduit 36 preferably extends from a fluid outlet opening upwardly along the down tube to attachment points on the handlebar stem 28. As illustrated in FIG. 1, the fluid container is preferably supported just above the bottom bracket junction 24 of the down tube and seat tube. This lowers the center of gravity of the bicycle and thus improves stability compared to prior art systems that place the weight high on the bike or on the rider's back.

Figure 2:
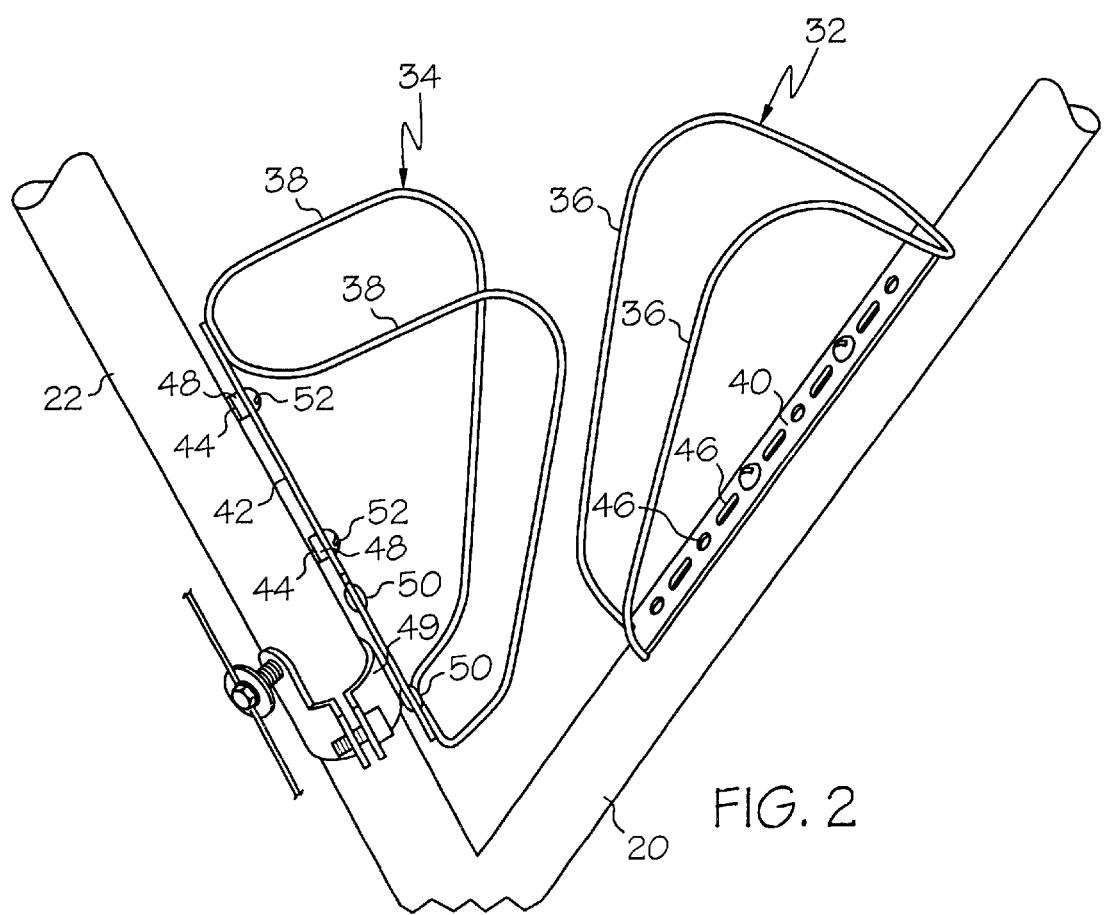
FIG. 2 is a perspective view of the support brackets of the preferred embodiment attached to the down tube and seat tube frame members of a bicycle.

FIG. 2 shows a perspective view of the support brackets 32, 34 of the preferred embodiment attached to their respective frame members. The sides 36, 38 of the support brackets are affixed to a respective central mounting plate 40, 42. The support brackets preferably describe a U-shape at their upper ends and taper downward and inward toward the bicycle bottom bracket. In the preferred embodiment, the distance between the outer sides of the U-shape at the top of the bracket is approximately 3 inches, tapering to a distance of approximately 2 inches between the outer sides at the lower end of the support bracket. These dimensions provide an aerodynamic profile and have been shown to provide ample clearance between the sides of the insulative cover and a cyclist's legs while pedaling. However, narrower or wider dimensions may be preferred where aerodynamics or storage capacity are overriding considerations.

The design of the support bracket, as shown in FIG. 2, allows the system to be used on the great majority of adult bicycles. Most bicycles marketed to adult cycling enthusiasts, including bikes intended for road and off-road use, have two sets of threaded openings 44 (often referred to as water bottle cage bosses) in the inter-frame side of the seat tube and the down tube for the purpose of mounting conventional water bottle cages. The distance between the centers of these threaded bosses is typically within the range of 63 to 66 millimeters. However, their location on the down and seat tubes in relation to the bottom bracket will vary considerably from bike to bike. For example, on mountain bikes the seat tube bosses will often be located low on the tube, near the bottom bracket, because the rearward and downward slope of the top tube 26 (as shown in FIG. 1) limits the clearance available for removing and replacing a water bottle mounted to the seat tube. On road bikes, the location of the seat tube bosses is generally higher than on mountain bikes. The location of the threaded down tube openings in relation to the bottom bracket will also vary depending on the manufacturer's design preferences.

As shown in FIG. 1, the support brackets are typically positioned on the seat and down tubes so that the uppermost points on the brackets are roughly level, but the relative orientation of the brackets will vary depending on frame geometry and the size of the brackets. Generally, it is preferable first to mount the seat tube support bracket so that the lower end of the bracket is roughly 2 to 3 inches above the top surface of the bottom bracket shell joining the down tube and seat tube, and then to mount the down tube holder. As shown in FIG. 1, a securement strap 31 may be used to prevent the insulative cover and fluid container from bouncing in the support brackets over rough terrain or from sliding out when the bike is placed on its side. Preferably, this strap has a section of hook fastening material affixed at each end of the length of loop fastener material so that the hook and loop sides are all on the same surface of the strap. The strap is fastened to one side of the down tube support bracket, passed over the insulative cover, and fastened to the other side of the support bracket.

The support brackets of the preferred embodiment can accommodate a wide variation in the location of the threaded openings, while still permitting the brackets to be positioned as described above, because the holes 46 in the bracket's central mounting plate provide a number of possible attachment points. The support brackets can be mounted anywhere along the range from where the lower boss meets to lowermost mounting hole to where the upper boss meets the uppermost mounting hole. The mounting plate is also designed so that one round hole and one obround hole are used in attaching the support bracket, which accommodates typical bike-to-bike variations in the spacing between the bosses. Preferably, a round hole is at each end of the mounting plate.

Small spacer washers 48 are preferably used to provide the necessary clearance for the front derailleur mounting band on those bikes that have clamp-on front derailleurs. In addition, small rubber bumpers 50 are preferably inserted into round openings in the central mounting plate, in order to prevent the mounting plate from bending and contacting the frame tubes. On bikes that have water bottle bosses that extend only minimally above the surface of the frame tubes, the spacer washers can also be used to raise the attachment surface to approximately the same height as the protective bumpers, so that the edge of the mounting plate is parallel to the surface of the tube after being attached. The brackets can be fastened to the water bottle bosses by means of pan-head stainless steel screws 52 or other suitable threaded fasteners.

In the preferred embodiment, the central mounting plate is stamped from stainless steel sheet and deburred. This is an economical method for high volume production, but other materials and manufacturing methods will also work. The gauge of the steel can vary depending on the strength and weight characteristics that are desired, but 14 gauge has been shown to provide a good balance of torsional stiffness and light weight for most applications. In the preferred embodiment, the sides 36, 38 of the support bracket are formed from a single length of stainless steel wire, so that the middle section of the wire resembles a U-shape with the mid-point being approximately at the bottom center of the U-shape. The remaining wire is angled symmetrically downward and slightly inward from the top of each side of the U-shape to a point just before each end, at which point each end section bends symmetrically inward so that the ends abut one another in perpendicular alignment with the bottom of the U-shape. The bottom of the U-shape is welded to the top surface of one end of the mounting plate and the abutted ends of the bracket sides are welded to the top surface of the other end of the mounting plate, using conventional welding methods.

Figure 3:
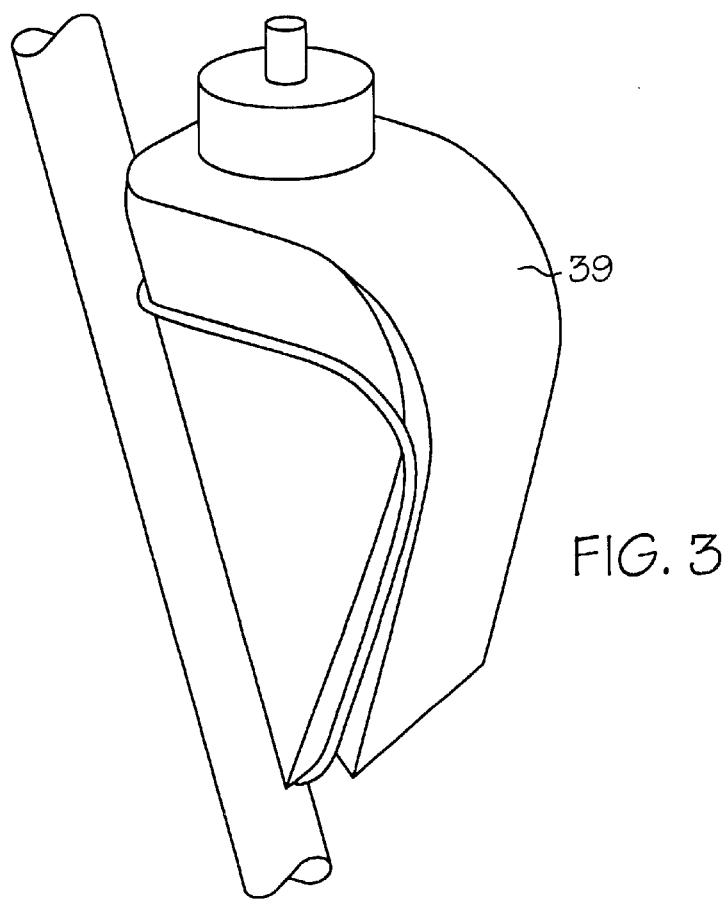
FIG. 3 is a perspective view of an molded bottle held within the preferred support bracket.

The preferred support bracket may also be used to hold a container 39 that has been molded into a shape that allows the container to be inserted into the space between the sides of the support bracket and retained by the sides of the bracket, as shown in FIG. 3.

A full-hard spring temper stainless steel is especially preferred for the bracket sides, because it allows the use of relatively small diameter wire, in the range of 0.120" to 0.140" for a general purpose support bracket, but other materials and diameters will also work and may be preferred for special applications. The use of stainless steel for the mounting plate and bracket sides also enables the support bracket to be electropolished as a final step, which gives the bracket an attractive bright finish and an elegant appearance on the bike.

Because of the variations in the angle formed by the bottom bracket junction of the seat tube and down tube, a rigid fluid container, such as a molded plastic bottle, will not always fit flush against the entire length of both central mounting brackets. A rigid container would also require some type of vacuum relief means, and the liquid contents would be susceptible to sloshing during riding. In addition, a rigid container would be difficult to use with small-size mountain bikes, because the container could not be bent or folded to allow it to be inserted into the support brackets at the necessary angle to clear the top tube. A collapsible beverage container, such as one made from a flexible polymeric film material, a overcomes these problems, and is therefore preferred for the fluid container of the present invention. The container's flexibility enables it to conform to a variety of dimensions and to be inserted into support brackets mounted on small-size mountain bikes. A vacuum relief means is not required, because the container's sides will simply collapse around the remaining liquid as the container is emptied, which also minimizes any sloshing of the liquid. In this regard, it is helpful, after filling the fluid container, to evacuate the remaining air in the container by squeezing the liquid toward the filling port and then closing the container.

Figure 4:
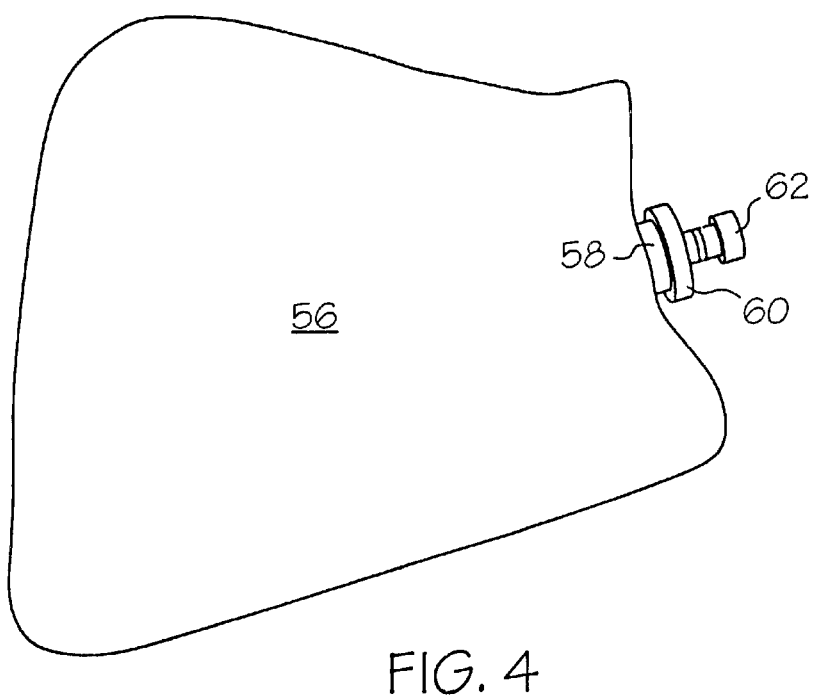
FIG. 4 is a side view of the fluid container and screw closure of the frame-mounted embodiment of the present invention.

FIG. 4 shows a side view of the fluid container 56 of the preferred embodiment. This general shape has been shown to work well in the present invention. As the container expands when filled, the slightly curved sides will straighten and conform to the interior of an insulative cover when the container and cover combination are placed in the support brackets. However, it can be appreciated that many different variations on the basic shape disclosed in FIG. 4 will also work, because of the ability of a flexible container to conform to the shape of a supporting structure.

As with all of the components that come into contact with the beverage liquid, the fluid container should be made from a material that complies with applicable FDA regulations for direct food contact. The material should have good flexibility and strength and should be able to withstand liquid temperatures up to boiling without deforming. Ideally, the opacity of the film should allow the user to view the level of the liquid inside, which helps the user to gauge the amount of liquid being placed in the bladder and to avoid overfilling. A material that has been shown to be well-suited for this application is polyethylene film, and in particular, film composed of metallocene-catalyzed polyethylene, which exhibits excellent strength and flexibility characteristics. The gauge of film that is used will depend on the film's physical properties and the desired balance of strength, flexibility, weight, and other factors, but a gauge in the range of 6 to 8 mils has been shown to work well in this application for certain types of metallocene-based polyethylene films. The use of polyethylene film as the container material also permits a threaded fill port 58 to be molded from a polyethylene resin that will give the fill port sufficient rigidity for tightening a screw closure while allowing the fill port to be sealed to the film using conventional methods. It can of course be appreciated that a number of other types of film, such as vinyl and polyurethane film and laminated polyethylene film, and a variety of film gauges could also be used in the fluid container.

In the preferred embodiment of the fluid container, shown in FIG. 4, a flanged, threaded fill port 58 is first sealed onto a single piece of film, and then the film is the folded over and the edges are sealed. This results in the fill port being located at the upper forward edge of the fluid container when mounted on the bike, which enables the conduit to extend from the interior of the container toward the handlebar stem in a relatively straight line parallel with the down tube. This configuration also positions the screw closure 60 above the liquid level during the majority of time the system is in use, which helps to prevent leakage caused by an improperly tightened closure.

Figure 5:
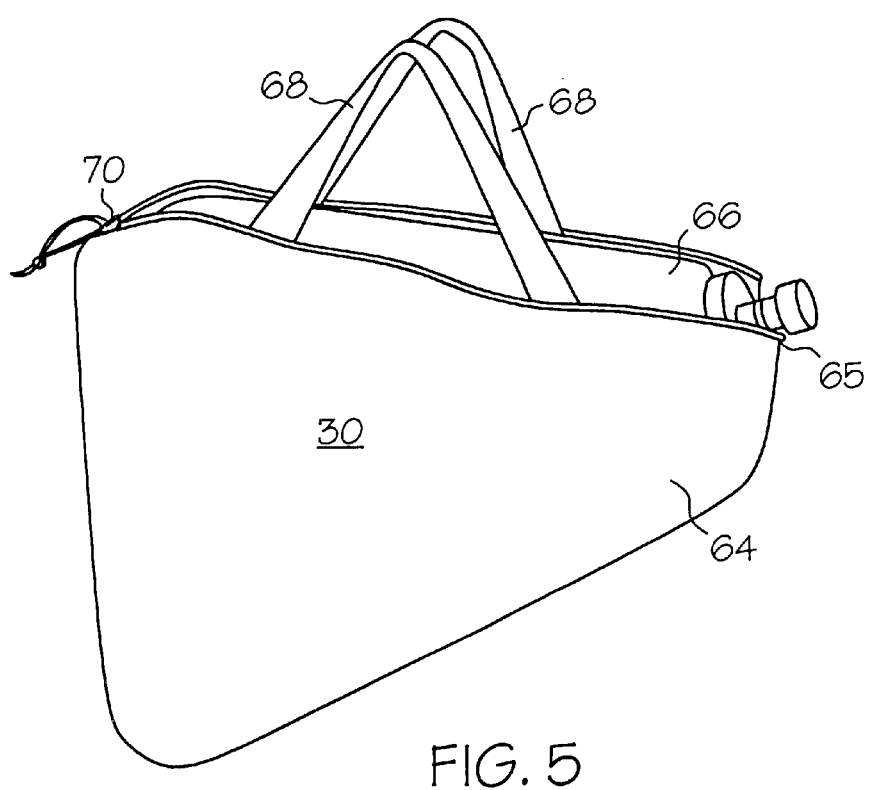
FIG. 5 is a perspective view of the outer bag component of the preferred insulative cover, zipped open with carrying handles.

Because the preferred fluid container is collapsible, the sides will expand outward when the container is filled. If the sides are not restrained in the support brackets, the filled container would tend to sag as the sides bulge outward around the sides of the preferred support bracket structure. Therefore, it is important that the sides of the container be supported in the support brackets or that the container be suspended from the support brackets to prevent sagging. In the preferred embodiment, the fluid container is supported in the brackets by an insulative cover comprised of an outer bag 64 and a foam insulation insert 66, as shown in FIG. 5. The insulation insert should be of a sufficient density to provide a fairly rigid shell for the fluid container when it is placed in the support brackets. The thickness of the insulation insert can vary depending on the type of material used and the desired balance of weight, rigidity, insulating properties, and available fluid container capacity. A combination that has been shown to work well in this application is a polyolefin closed cell foam with a density in the range of 4 to 6 pounds per cubic foot and a thickness of approximately ⅛ inch. It can of course be appreciated that closed cell foam is not the only possible light weight insulation material that can support the sides of the filled fluid container. For example, an air cell insulation material, which is available in different thicknesses and often has a foil backing on at least one side, has also been shown to work.

Figure 6:
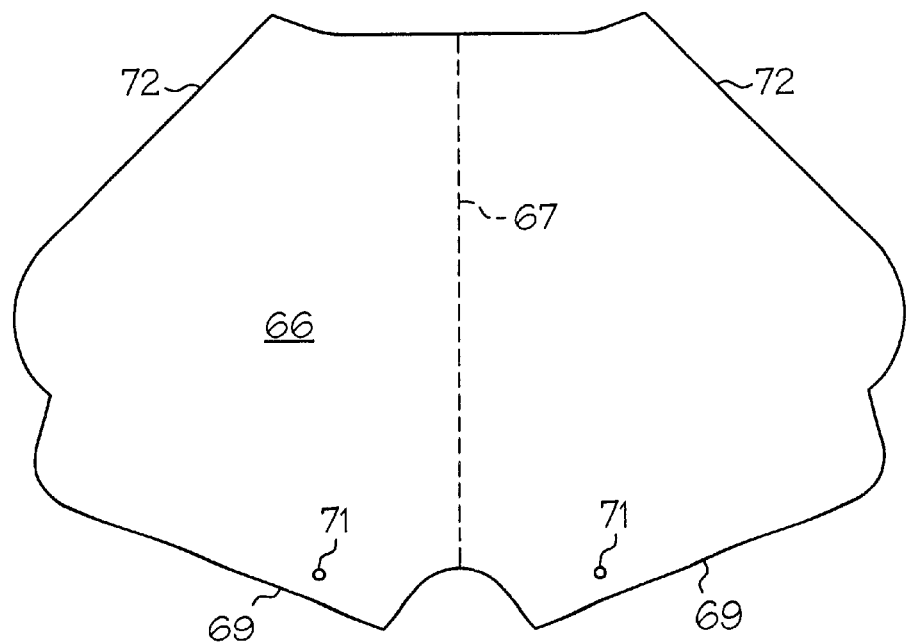
FIG. 6 shows a cutting pattern and fold line for the foam insulation insert of the preferred insulative cover.

As shown in FIG. 6, the insulation insert is preferably die cut from a roll or sheet of the foam or other insulation material in the desired thickness. The insulation insert is folded so that fold line 67 runs along the down tube frame member, and the back edges 69 are overlapped. The foam insert should rest flush against the entire length of both the down tube and seat tube central mounting plates when the insert is lightly pushed into the support brackets. If the fit is not flush against both mounting plates, the amount of overlap at the top of the back edge of the foam insert can be increased or decreased as necessary to achieve a good fit. This adjustment will typically be required to accommodate significant variations in the angle formed by the junction of the seat tube and down tube. A nylon panel fastener is preferably used to secure the lower portion of the rear edge together by fastening it through holes 71.

The outer bag of the preferred insulative cover, shown in FIG. 5, provides a means for housing the foam insert and carrying the fluid container when off the bike. Handles 68 can be sewn on the inside of the bag to enable the user to fill the container and carry it to the bike with the preferred closure means, a zipper 70, open. The cyclist can then place bag in the support brackets, fold over the top edges 72 of the foam insert (shown in FIG. 6), tuck in the handles, and zip the bag closed. In the preferred embodiment, the zipper closes from rear to front, and a small opening remains at the front 65 of the bag when the zipper is closed, so as to provide a passageway for the conduit. Having the handles on the inside of the closed bag also gives the bag a clean and aerodynamic appearance on the bike. The pattern for the outer bag is slightly larger than the dimensions of the empty fluid container, so as to accommodate the foam insert, but the bag shape is similar to that of the fluid container. The bag material would typically be a fabric such as is commonly used in backpacks and sports bags. The weight of the fabric used will depend on the desired balance of durability and light weight. A 200 denier coated nylon has been shown to work well in a bag application where light weight is a primary objective, but a number of different fabrics will work, as can be appreciated. The bag fabric is much more supple and conformable than the foam insulation and therefore does not require any means of adjustment to accommodate differing frame geometries, as is the case for the insulation insert.

Figure 7:
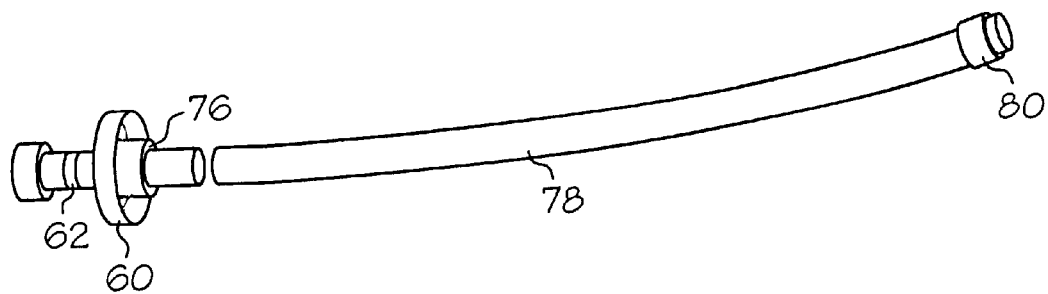
FIG. 7 shows the section of conduit that is detachably connected to a tube connector at the inside of the fluid container closure and extends to an inlet end with a check valve.

When fitted with a threaded fill port, the fluid container is preferably closed with a closure assembly as shown in FIG. 7. This assembly includes a screw cap 60 that has a round hole punched or molded in the center. In the preferred embodiment, the diameter of this hole is just large enough to permit the hose barb end of a female quick disconnect coupling 62 to pass through the hole to the hose barb shoulder. Preferably, the female connector on the fluid container side includes a shut-off feature that provides a seal against leakage when the male and female connectors are disconnected. The quick connect couplings from Colder Products Company are well suited for this application. The hose barb is inserted through the hole in the screw closure and into a flanged tube connector 76. The flange of the tube connector seats against the inside of the cap and functions as a gasket to provide a leak-proof seal when the cap is tightened. The tube connector should comply with the applicable FDA requirements for food contact, and it should be made from a material with sufficient resilience to allow the flange to compress slightly when the cap is tightened.

A section of flexible tubing 78, as shown in FIG. 7, is inserted over the tube connector. This section of the conduit should be long enough to extend from the tube connector to a point just above the lower end of the beverage container. The tubing 78 can easily be removed from the tube connector 76 to drain and rinse this tube after use. Preferably, an elastomeric beverage grade tubing, such as silicone tubing, is used for this section of the conduit that is inside the fluid container. The use of a tubing material with a high amount of elasticity, such as silicone, facilitates the easy attachment and removal of the tube 78 from the tube connector, because the tubing is simply stretched over the tube connector. This also ensures a secure attachment of the tube connector. The elasticity of silicone also permits a cartridge check valve 80 to be inserted into one end of tube 78 without the need for an additional connector means, by simply stretching the tubing over the outside of the cartridge. The model no. 150 cartridge check valve with FDA compliant o-rings from Smart Products Incorporated works well in this application.

The assembly shown in FIG. 7 illustrates only one possible configuration. It can be appreciated that the same functionality can be achieved by the use of different combinations of parts and attachment methods. For example, the flanged tube connector could be lengthened so as to function also as the section of conduit, and the check valve could be removably connected to the end of the lengthened tube connector by means, for example, of a short section of elastomeric tubing into which the check valve has been inserted. Other configurations can also be imagined consistent with the teachings of the invention.

Figure 8:
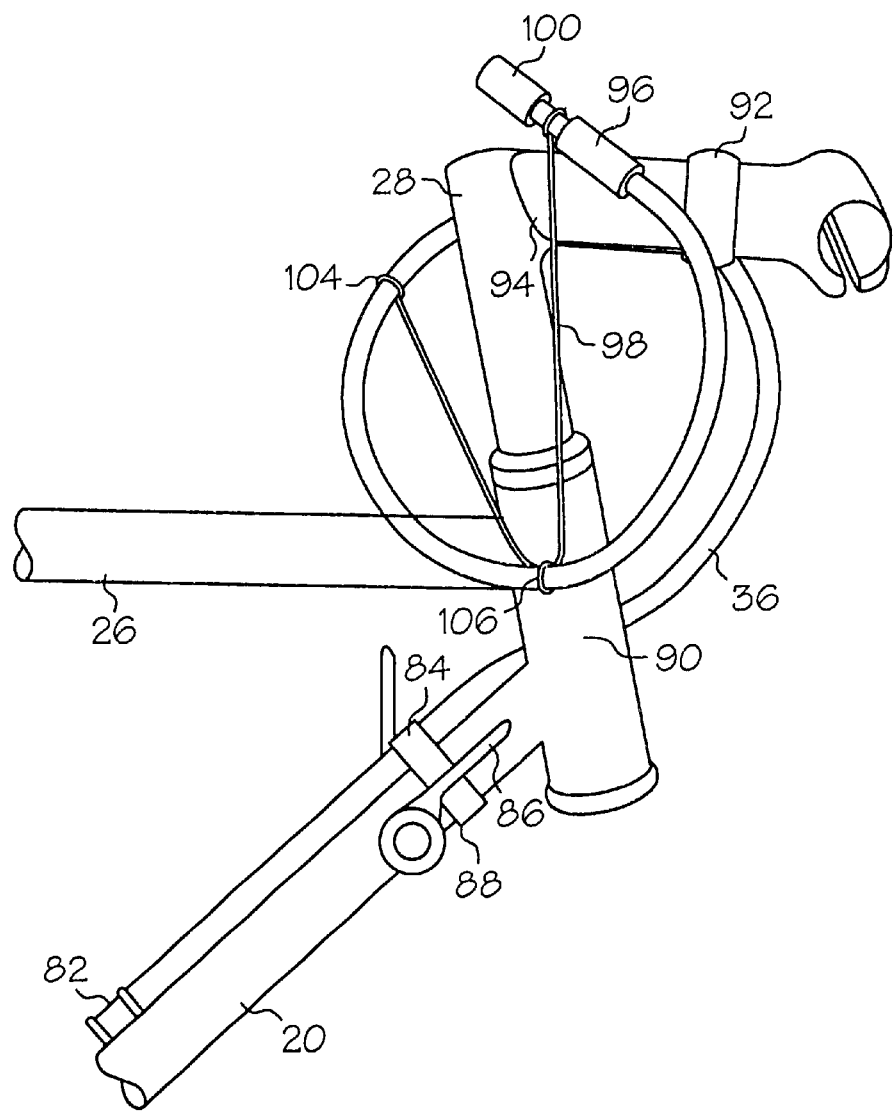
FIG. 8 shows a side perspective view of the preferred means of securing the conduit to the bicycle down tube and handlebar stem.

An hose barbed male tube connector 82, shown in FIG. 8, allows the outlet section of the conduit to be easily and quickly connected to, and disconnected from, the female quick connect coupling located at the outlet side of the screw closure. If desired, the conduit can be attached to the down tube by means of a hook and loop fastening strap 84. The Velcro®) One Wrap® strap, which has a hook fastener surface on one side and a loop fastener surface on the other side, has been shown to work well for this purpose. The One Wrap® strap is first attached to the beverage tube and then fastened around the down tube. The use of a One Wrap® or other hook and loop fastening strap allows the beverage tube to be easily removed from the down tube and avoids the need for a special attachment clip that would have to be mounted to the down tube. This strap is preferably fastened around the down tube at a point just above the traditional location of down tube mounted derailleur shifters 86 located on the down tube of most adult bicycles. For road cyclists that use traditional down tube mounted derailleur shifters, a small section of adhesive-backed hook or loop fastener material may be adhered at a location on the underside 88 of the down tube to prevent the fastening strap and conduit from sliding around the down tube and possibly interfering with the operation of the shifters.

FIG. 8 shows a means of attaching a flexible beverage conduit 36 to the handlebar stem 28. The beverage tube passes beside the bicycle steering column 90 and loops upward beside the handlebar stem to a first point of attachment. The loop then curves downward across the top tube 26, and then upward where the outlet end is attached on the opposite side of the handlebar stem from the first point of attachment. The conduit is preferably attached at the first point of attachment by means of a hook and loop fastening strap 92. The Velcro® One Wrap® strap has been shown to work well for this purpose. This means of attachment allows the beverage tube to be quickly and easily removed from the bicycle. In the preferred embodiment, the loop fastener side of the One Wrap®) strap passes over to the forward edge of a handlebar stem-mounted length of hook fastener 94, described below, thereby securing the strap to the handlebar stem.

FIG. 8 also shows the preferred hook and loop fastening arrangement for the outlet end of the beverage tube. A section of hook fastener material 94 is adhered to the side of the handlebar stem where the beverage tube passes beside the stem. A length of loop fastener material 96 is adhered around the circumference of the end of the beverage tube. It is preferable to overlap the ends of the loop section slightly, so that the adhesive bonds to the loop material as well as to the surface of the beverage tube, thus ensuring a more peel-resistant attachment. The hook fastener that is adhered to the handlebar stem should have sufficient width and length to provide a generous attachment surface for the beverage tube. A width of 1 inch and a length of 2.25 inches works well. The loop fastener that is adhered to the beverage tube should also be at least 1 inch wide. The hook and loop fasteners should have a pressure sensitive adhesive backing that will maintain good adhesion in wet and warm conditions. Examples of hook and loop fasteners that have been shown to work well in this application are the 3M Scotchmate™ SJ3526 and SJ3527 industrial fasteners.

When a drink is desired, the rider can simply pull the end of the tube away from the loop fastener and raise the tube to his or her mouth to drink. When finished, the rider simply lowers the end of the tube and presses the beverage tube loop fastener 96 against the handlebar stem hook fastener 94 to secure the tube. This provides a convenient and dependable method of securing the end of the tube to the handlebar stem. However, if riding conditions warrant, an even stronger securement of the beverage tube to the handlebar stem can be obtained by passing the loop side of the fastening strap 92 across the tube and fastening it to the handlebar stem hook fastener 94.

FIG. 8 shows an elastic cord 98 that is attached to the outlet end of the beverage tube of the preferred embodiment at a point just below a push-pull valve 100 and at two other locations along the beverage tube. The purpose of the cord is to maintain the looped configuration of the cord if it is accidentally dropped by the rider, and thereby prevent the end of the beverage tube from swinging against the front wheel of the bicycle. Preferably, one end of the elastic cord is attached at a location approximately where the tube passes behind the handlebar stem, and the middle attachment point is approximately midway between the two outer attachment points. The elastic cord can be attached at the outlet end by sliding a small loop in one end of the cord over the valve. The other end of the elastic cord can be attached to the beverage tube by means of a small cable tie 104, which is inserted through a small loop in the end of the elastic cord and then fastened around the beverage tube. A second cable tie 106 secures the middle of the elastic cord to the beverage tube. The elasticity and diameter of the cord should permit the coiled beverage tube to be easily straightened with by the rider for drinking, but prevent the tube from straightening when it is dropped. Elastic cord with a diameter of approximately 1/16" and elasticity in the range of 100–150% has been shown to work well in this application.

The preferred valve 100 is inserted into the end of the preferred beverage tube and is operated by means of pushing or pulling a cap that slides over the end of a rigid tube inserted into the beverage tube. The valve can be operated by the rider with one hand by sliding the cap into an open or closed position with the thumb, or it can be opened by pulling on the back edge of the cap with the teeth. If desired, an elastomeric sleeve can be stretched over the valve cap to provide a softer surface for the rider's teeth and lips. This sleeve would typically be silicone tubing or another suitable elastomeric tubing that has been cut to approximately the same length as the valve cap.

Although a valve is not necessary to prevent liquid from draining from the tube during riding, because the outlet end will generally be the highest point of the system, when riding over rough roads some liquid may splash from the end of the tube if it is not closed. While such splashing will typically result in only minimal liquid loss, it may be a nuisance to the rider. However, some riders may prefer a valveless mouthpiece, which can be accomplished, for example, by removing the valve cap.

Figure 9:
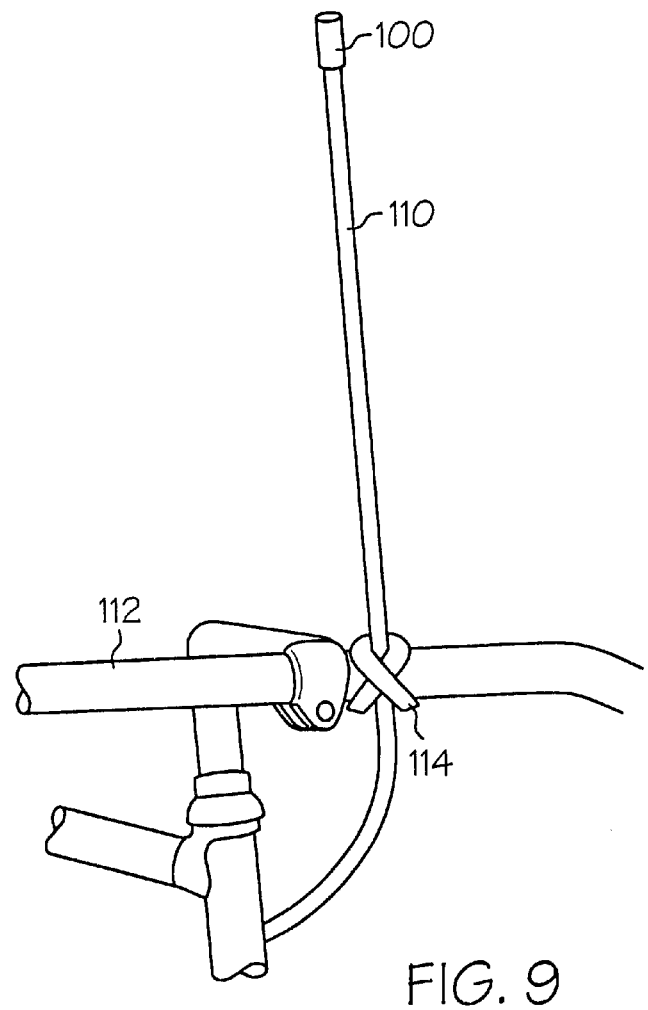
FIG. 9 shows an alternative semi-rigid conduit attached to the handlebar of a bicycle by means of a hook and loop fastening strap.

FIG. 9 shows an alternative semi-rigid conduit 110 for supplying liquids to riders who prefer to drink from a fixed-position tube. This conduit preferably is comprised of a beverage grade polyolefin tubing, such as polyethylene tubing, and is removably secured to the bicycle handlebar 112 or to an "aerobar" handlebar extension by means of a hook and loop fastening strap. The use of such a Velcro® One Wrap®) strap, for example, allows the rider to adjust the upward angle of the tube by changing the location at which the strap is secured to the tube. A valve 100 may also be used in connection with the semi-rigid conduit.

Figure 10:
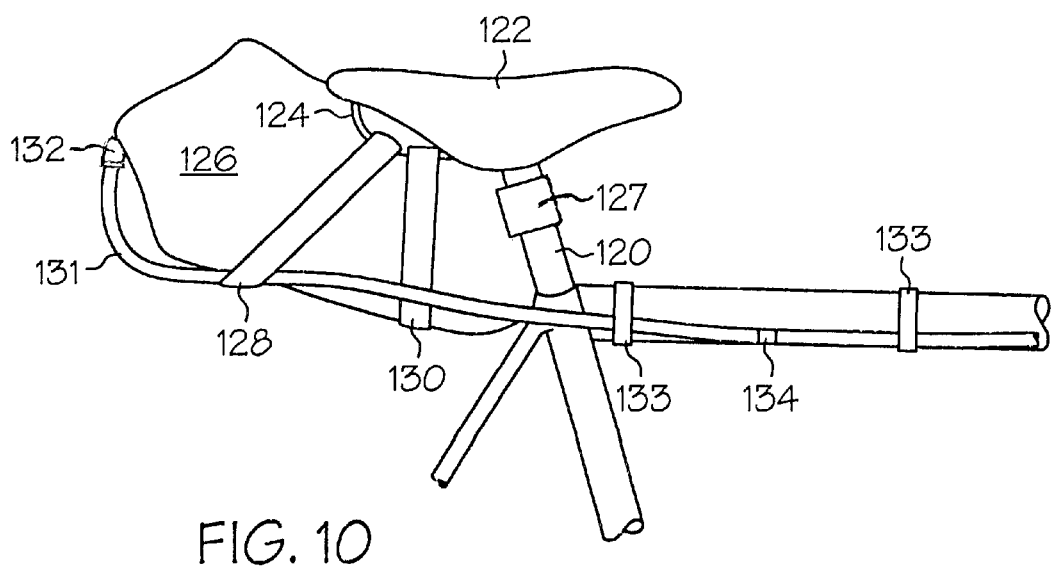
FIG. 10 is a side perspective view of the insulative cover and conduit of the saddle-mounted embodiment attached to the saddle rails and seat post of a bicycle.

Finally, FIG. 10 shows a saddle-mounted embodiment of the present invention, suitable for bicycles with a seat post 120 and a conventional saddle 122 with rails 124 beneath the saddle that attach to the seat post. An insulative cover 126 encloses a fluid container that, like the frame-mounted system, has a conduit extending from within the fluid container to a location within reach of the cyclist. The insulative cover is preferably secured to the seat post by hook and loop strap 127 and the rails on each side of the saddle by means of hook and loop fastener straps 128, 130. In the preferred embodiment, a male elbow connector 130 connects the conduit 131 to a female quick disconnect connector located at the outlet side of the fluid container. The conduit is preferably secured to the top tube frame member 26 by hook and loop straps 133 and attaches to the handlebar stem or handlebar in the manner described for the frame-mounted fluid container. A check valve means located at the inlet end of the conduit may also be employed to prevent liquid from flowing back down the tube. However, a check valve is not as critical in the saddle-mounted version because the fluid container is positioned at a much higher level relative to the outlet end of the conduit. An additional disconnection means 134 may be provided to allow a section of semi-rigid conduit to be removably connected to a section of the flexible conduit extending from the fluid container. Preferably, such additional disconnection means is a simple sleeve connector adapted to be inserted into the ends of the conduit.

While the present invention has been described with respect to specific embodiments, it is to be understood that other modifications and changes may be made to the disclosed embodiments without departing from the spirit and scope of the invention as defined by the following claims.

I claim:

1. A support bracket for holding articles within the interframe area above the bottom bracket junction of a bicycle down tube frame member and seat tube frame member, said support bracket comprising, in combination:
   (A) Bracket sides comprised of a single length of wire or metal tubular material having two ends and a mid-point halfway between the ends, and formed so that the middle section of said wire or tubular material roughly defines a U-shape with the mid-point being approximately at the bottom center of the U-shape, and further formed so that the remainder of said length of wire or tubular material angles symmetrically downward and slightly inward from the top of each side of the U-shape to a point just before each end, at which point each end section angles symmetrically inward so that the ends abut one another in perpendicular alignment with the mid-point and the bottom of the U-shape;
   (B) A central mounting plate comprised of a material compatible for welding to said holding means and having a top and bottom surface and two sides running lengthwise and two sides running width wise and defining the ends of said mounting plate, with said mounting plate having a series of apertures formed along its length and adapted for fastening said mounting plate to the threaded openings customarily used for attaching water bottle cages to bicycle down tube and seat tube frame members;
      wherein said bracket sides and said mounting plate by joined together by welding the bottom of the U-shape of said bracket sides to the top surface of one end of the mounting plate and welding the abutted ends of said bracket sides to the top surface of the other end of said mounting plate.

2. The support bracket of claim 1, wherein the apertures in said mounting plate are a series of alternating round a obround openings formed along the lengthwise center of said mounting plate, with the obround openings oriented so that their lengthwise dimension is parallel to the lengthwise sides of said mounting plate, and the centers of said openings being an equal distance apart and spaced so that each round and obround opening may be used in combination with a counterpart obround and round opening, respectively, to fasten said mounting plate to said threaded openings.

3. The support bracket claim 1, wherein said bracket sides are formed from spring temper stainless steel wire and said mounting plate is stamped from stainless steel sheet material.

4. The support bracket of claim 1, additionally comprising a molded container adapted to be removably inserted into the bracket sides so that said molded container is held in place by said bracket sides.

5. A liquid storage and delivery system for mounting on a bicycle having a down tube frame member and a seat tube frame member that are joined at an angle to one another at a bottom bracket junction, said system comprising:
   (A) A first support bracket having sides defining an open space between said sides and having a central mounting plate to which the sides of said support bracket are attached, with said mounting plate having a series of apertures along its length adapted for fastening said mounting plate to the threaded openings customarily used for mounting water bottle cages to the bicycle down tube frame member;
   (B) A second support bracket having sides defining an open space between said sides and having a central mounting plate to which the sides of said support bracket are attached, with said mounting plate having a series of apertures along its length adapted for fastening said mounting plate to the threaded openings customarily used for mounting water bottle cages to the bicycle seat tube frame member,
   (C) A fluid container adapted to be removably inserted within the sides of said first and second support brackets and having an opening adapted to permit the passage of liquid through a liquid delivery conduit;
   (D) A conduit for delivering liquid to a cyclist extending from within said fluid container, through said opening, and to an attachment location at the bicycle handlebar or handlebar stem.

6. The liquid storage and delivery system of claim 5, wherein the sides of said support brackets extend a progressively greater distance away from their respective frame members as the sides extend upward from their lowermost point when said support brackets are mounted on their respective frame members.

7. The liquid storage and delivery system of claim 5, wherein said first and second support brackets are interchangeable.

8. The liquid storage and delivery system of claim 5, further including a securement strap adapted to fasten to one side of a support bracket and extend over said fluid container and fasten to the other side of said support bracket.

9. The liquid storage and delivery system of claim 5, wherein said liquid delivery conduit is comprised of semi-rigid beverage tubing that is adjustably secured to the handlebar or to a handlebar extension by means of a hook and loop fastening strap.

10. The liquid storage and delivery system of claim 5, further including the combination of a flexible outer bag provided with a closing fastener and adapted to enclose said fluid container and an insulative material adapted to be removably inserted into said bag and to adjustably conform to the angle formed by the junction of the bicycle seat tube and down tube frame members.

11. The liquid storage and delivery system of claim 10, wherein said insulative material Is a single piece of closed cell foam insulation.

12. The liquid storage and delivery system of claim 5, wherein said liquid delivery conduit is removably attached to the handlebar stem by means of hook and loop fasteners.

13. The liquid storage and delivery system of claim 12, wherein said liquid delivery conduit extends from the fluid container to a point roughly below the handlebar, where said conduit then extends in a looped configuration upwardly and rearwardly to a first point of attachment on one side of the handlebar stem, then downwardly and across a bicycle top tube frame member, and then upwardly to a second point of removable attachment on the other side of the handlebar stem.

14. The liquid storage and delivery system of claim 13, further including an elastic cord that is attached to said liquid delivery conduit at a first location approximately where said conduit crosses behind the handlebar stem, at a second location just below the outlet end of the conduit, and at a third location approximately halfway between the first and second locations.

15. The liquid storage and delivery system of claim 5, wherein said fluid container includes a threaded fill port sealed by means of a screw closure, with the opening In said fluid container being comprised of a hole formed in the middle of the screw closure.

16. The liquid storage and delivery system of claim 15, wherein said fluid container is comprised of a flexible polymeric film material.

17. The liquid storage and delivery system of claim 15, wherein said liquid delivery conduit includes a disconnection means at the outlet side of said screw closure.

18. The liquid storage and delivery system of claim 17, wherein said disconnection means is comprised of a female quick disconnect tube connector with a flow shut-off capability and a male connector, with said female connector being oriented on the inlet side of the connection so as to provide a seal against leakage from said fluid container when said connectors are disconnected.

19. The liquid storage and delivery system of claim 17, wherein said liquid delivery conduit further includes a disconnection means at the inlet side of said screw closure.

20. The liquid storage and delivery system of claim 19, wherein the section of said liquid delivery conduit extending from the inlet end of said conduit to the disconnection means at the inlet side of said screw closure is comprised of flexible beverage tubing.

21. The fluid container of claim 20, further including a check valve means located at the inlet end of said flexible beverage tubing and oriented to prevent the backflow of liquid into the fluid container.

* * * * *